(Model.)
J. F. PENROD.
NUT LOCK.
No. 276,872. Patented May 1, 1883.
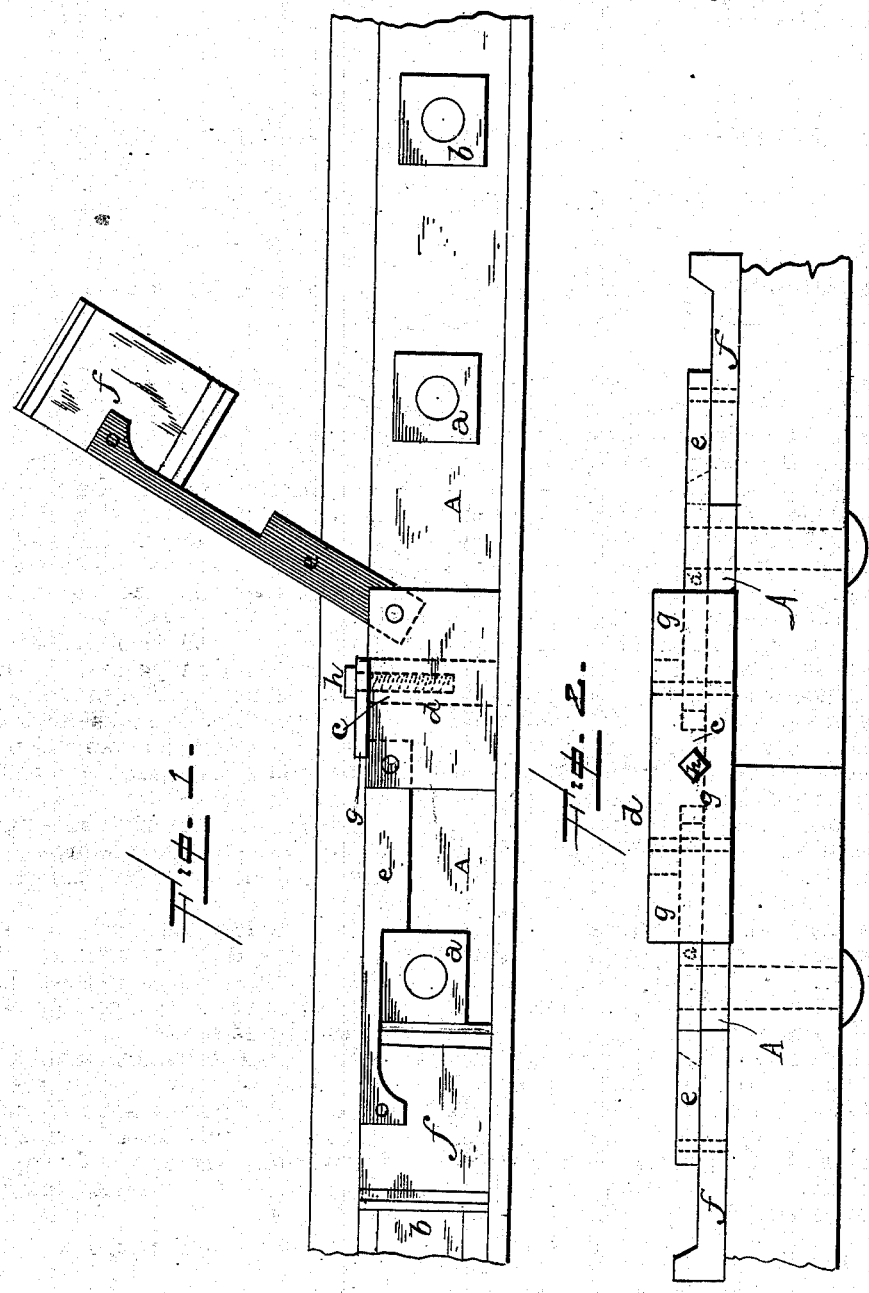

UNITED STATES PATENT OFFICE.

JOHN F. PENROD, OF BLAIRSVILLE INTERSECTION, PENNSYLVANIA.

NUT-LOCK.

SPECIFICATION forming part of Letters Patent No. 276,872, dated May 1, 1883.

Application filed December 22, 1882. (Model.)

*To all whom it may concern:*

Be it known that I, JOHN F. PENROD, a citizen of the United States, residing at Blairsville Intersection, county of Westmoreland, State of Pennsylvania, have invented certain new and useful Improvements in Nut-Locks, of which the following is a specification, reference being had therein to the accompanying drawings.

My invention relates to an improvement in nut-locks to be applied to nuts on the bolts that secure fish-plates on rail-joints; and it consists in blocks at the ends of two movable arms or levers, pivoted to the fish-plate, which blocks, when lowered, drop in between the nuts to prevent their turning, and when raised set the nut free to be tightened or removed, as will be fully described hereinafter.

The accompanying drawings represent my invention.

Figure 1 is a side elevation of my invention. Fig. 2 is a plan view of the same.

The fish-plate A is of the usual form, and of a thickness to be flush with the crown of the rails when placed on the web, with one hole at each end for the bolts, that are inserted from the opposite side, to pass through both rails and fish-plates. At the middle of the fish-plate is a short projection, $c$, with an oblong plate, $d$, that extends to both sides beyond the projection, and is of the width of the fish-plate. The lower edges of the fish-plate and of the plate $d$ are beveled, and fit the foot of the rails upon which they rest when attached to the web. In the space at each side of the projection $c$, between the fish-plate and the plate $d$, are pivoted arms or levers $e$, at the ends of which are movable blocks $f$, of a length equal to the distances between the nuts $a$ and $b$. The length of the arms $e$ is such that, when lowered on a line with the fish-plate, the blocks $f$ enter into the space between the nuts $a$ and $b$, and, bearing against their sides, prevent their turning back or forward. To allow the arms $e$ to be laid level with the upper edge of the fish-plate, their under sides are partly cut away over the nuts $a$, leaving shoulders that, with the block $f$, when lowered, combine to lock these nuts. The blocks $f$, when lowered, are secured in that position by means of a plate, $g$, laid on top of them and on the upper edge of the fish-plate, and secured by a screw, $h$, that enters into the projection $c$. When desired to loosen the nuts or to gain access to them for any purpose the plate $g$ has first to be removed, when the arms holding the blocks can be raised to expose the nuts.

Having thus described my invention, I claim—

1. In a nut-lock, the combination of a pivoted arm provided with means to lock a nut or nuts in place, with a locking plate or device to catch down over the top of the arm, substantially as shown.

2. In a nut-lock, the combination of the fish-plate A and the nuts $a\ b$ upon the bolts with the projection $c$, plate $d$, arms $e\ f$, locking-plate $g$, and screw $h$, substantially as set forth.

In testimony whereof I affix my signature, in presence of two witnesses, this 27th day of October, 1882.

JOHN F. PENROD.

Witnesses:
J. M. HORACH,
GEO. McCUNE.